United States Patent Office 3,326,912
Patented June 20, 1967

3,326,912
PROCESS FOR THE PRODUCTION OF 2-MERCAP-TO-4,6-BIS-AMINO-s-TRIAZINE DERIVATIVES
Hiroshi Yamamoto, Tokyo, and Takashi Namekawa, Kawaguchi, Japan, assignors to Nippon Kayaku Kabushiki Kaisha, Tokyo, Japan, a corporation of Japan
No Drawing. Filed Dec. 11, 1964, Ser. No. 417,839
Claims priority, application Japan, Dec. 13, 1963, 38/66,531
7 Claims. (Cl. 260—249.8)

The present invention relates to a new method of manufacturing herbicidally active 2-mercapto-4,6-bis-amino-s-triazine derivatives of the general formula

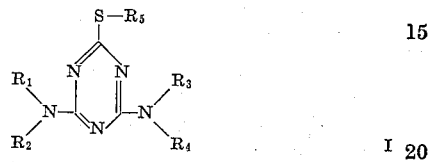

wherein the radicals $R_1$, $R_3$ and $R_4$ independently from each other represent hydrogen atoms or lower aliphatic hydrocarbon radicals the chains of which may be interrupted by oxygen or sulphur,
$R_2$ represents a lower aliphatic hydrocarbon radical the chain of which may be interrupted by oxygen or sulphur, and
$R_5$ represents a low molecular alkyl- or alkenyl-radical.

Many compounds of the general Formula I are known substances and are useful as herbicidally active ingredients in compositions for killing weeds and for inhibiting the growth of undesired plants.

In the above Formula I, the aliphatic hydrocarbon radicals represented by $R_1$ to $R_4$ are for instance lower alkyl- or alkenyl-radicals having at most 5 carbon atoms, e.g. methyl, ethyl, n-propyl, isopropyl, butyl and amyl radicals, as well as the allyl and methallyl radical.

Examples of hydrocarbon radicals $R_1$ to $R_4$ the chains of which are interrupted by oxygen or sulphur are the following radicals: lower alkoxyalkyl radicals such as the methoxymethyl, 2-methoxyethyl, 3-methoxypropyl, 2-methoxypropyl, ethoxymethyl, 2-ethoxyethyl, 2-ethoxypropyl, 3-ethoxypropyl, n- or iso-propoxymethyl, 2-propoxyethyl, 2-propoxypropyl; lower alkenyloxy alkyl radicals such as 2-allyloxyethyl and 2-methallyloxyethyl; lower alkoxyalkoxyalkyl radicals such as methoxyethoxyethyl and ethoxyethoxyethyl; lower alkylmercaptoalkyl radicals such as methylmercaptomethyl, 2-methylmercaptoethyl, 2-methylmercaptopropyl, 3-methylmercaptopropyl, ethylmercaptomethyl, 2-ethylmercaptoethyl, 2-ethylmercaptopropyl, 3-ethylmercaptopropyl, n- or iso-propylmercaptomethyl, 1-propylmercaptoethyl, 2- or 3-propylmercapto-n-propyl, 2- or 3-iso-propylmercaptopropyl; lower alkenylmercaptoalkyl radicals such as the 2-allylmercaptoethyl or the methallylmercaptoethyl radical.

As aliphatic hydrocarbon radicals are also meant hydroxyalkyl radicals such as the hydroxymethyl, 2-hydroxyethyl, 3-hydroxypropyl or the 2-, 3- or 4-hydroxybutyl radical, and alkanoyl radicals such as, e.g. the formyl, acetyl, propionyl, butyryl, isobutyryl and crotonyl radicals.

The preferred radicals $R_1$ to $R_4$ are hydrogen, lower alkyl, lower alkenyl and lower alkoxyalkyl radicals.

The preferred radical $R_5$ is the methyl radical, but $R_5$ may also represent other low molecular alkyl radicals with 2 to 4 carbon atoms such as ethyl, n-propyl, isopropyl, n-butyl or may represent a low molecular alkenyl radical such as the allyl or methallyl radical.

Different manufacturing methods for the compounds of general Formula I are known and have been employed hitherto, but all these known manufacturing methods are not quite satisfactory and present serious disadvantages.

The starting material for all manufacturing methods is cyanuric chloride $C_3N_3Cl_3$. The principle of the synthesis of compounds of Formula I consists theerfore in replacing two chlorine atoms of cyanuric chloride by two identical or different amine radicals

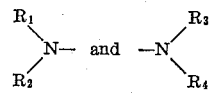

and one chlorine atom by an alkylmercapto- or alkenylmercapto group —S—$R_5$.

The starting materials for all manufacturing methods of compounds of Formula I are therefore the following:
Cyanuric chloride (II), first amine

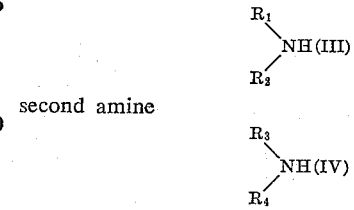

which may be identical with or different from (III), and substances (V) for replacing a chlorine atom in the triazine nucleus by the group —S—$R_5$.

The hitherto proposed manufacturing methods are the following:

Method A.—The first chlorine atom of cyanuric chloride (II) is reacted with an alkyl- or alkenyl mercaptan $R_5$—SH, for instance with methylmercaptan, and then the two remaining chlorine atoms are reacted with the amines III and IV. This process, however, necessitates the use in the first step of specific, relatively difficultly accessible and expensive acid binding agents, such as 2,4,6-trimethyl pyridine (sym. collidine). Furthermore the reaction of cyanuric chloride with the alkylmercaptan must be effected at considerably low temperatures such as —25° to —30° C. in order to ascertain the selective conversion of only one chlorine atom of the cyanuric chloride into the $R_5$—S— group. Furthermore this method gives comparatively low yields (Rec. trav. chim. 78, 967 (1959)).

Moreover the purification of the 2-alkylmercapto-4,6-dichlor-s-triazine obtained after the first step is indispensable in order to remove the hydrochloride of the acid-binding agent (collidine) which is formed as a by-product. Otherwise the reaction with the amines III and IV cannot be carried out.

A similar process using in the first step an alkali metal salt of an alkylmercaptan $R_5$SH is also known, but it has the disadvantage that this salt, e.g. $R_5$—S—Na must be first prepared, for example by the addition of a large excess of $R_5$—SH to metallic sodium in an anhydrous solvent. Otherwise the end products I cannot be obtained with a purity high enough for pratcical use as herbicides.

In other known processes, the cyanuric chloride is first reacted with two mols of an identical amine III or IV or stepwise with each one mol of two different amines III and IV in order to form (by replacing two chlorine atoms of cyanuric chloride by substituted amino groups) an intermediary 2-chloro-4,6-bis-amino-s-triazine of the general formula

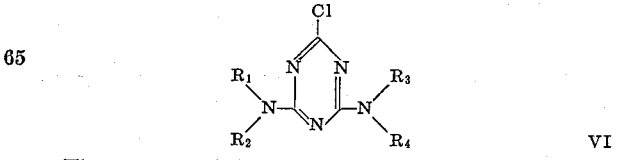

VI

The last step of the synthesis is the replacement of the remaining chlorine atom in the above Formula VI by the group —$SR_5$.

It is known that the single chlorine atoms in cyanuric chloride posses differing grades of mobility; whereas the first chlorine atom reacts with an alkylamine under normal conditions even in the cold, the reaction of the second chlorine atom requires a temperature between 20 and 40° C. and the third chlorine atom reacts only at increased temperatures.

Different methods have been proposed in order to effect this last step.

*Method B.*—The chlorine atom of the intermediary product of general Formula VI is reacted with alkali hydrosulphide in order to obtain 2-mercapto-4,6-bis-amino-s-triazines having a free HS-group in the 2-position and then alkylating the latter with conventional alkylating, especially methylating agents (German Patent No. 1,020,982). With respect to the small mobility and reactivity of the chlorine atom in the compound VI, the reaction with alkali hydrosulphide must be carried out under drastic reaction conditions, i.e. under pressure in an autoclave and at high temperatures [J. pr. Ch. (2) 33, 297 (1886)]. The yields obtained in this process are often unsatisfactory and the working under pressure with the highly corrosive alkali hydrosulphide solutions presents difficulties in the manufacturing and causes important problems of damage of the autoclave due to the corrosion of material by the alkali salts of $R_5SH$ and the difficulties of smooth operations and of high yields due to the unstability of the alkali salts of $R_5SH$ at the high temperatures. If the autoclave is not used, longer reaction time is necessary and lower yields are obtained. For example, only about 60% of yield and poor purity were obtained after 40 hours reflux in water-containing acetone.

It has also been proposed to effect the replacement of the chlorine atom in the Compound VI by the methylmercapto group by means of methyl mercaptan in a special inert solvent, i.e. in a secondary alcohol such as isopropanol or sec.-butanol and in the presence of an acid binding agent. This process too is not quite satisfactory as the reactivity of the chlorine atom remains relatively small and this process is not generally usable but restricted to the manufacturing of 2-methylmercapto-4,6-bis-amino-s-triazines.

*Method C.*—This manufacturing method uses special means for replacing in the last step the chlorine atom of the intermediary product of Formula VI by the mercapto group —SH, which latter may afterwards be alkylated with usual alkylating agents. This process consists in reacting a 2-chloro-4,6-bis-amino-s-triazine of Formula VI with thiourea, preferably in a diluted aqueous mineral acid in order to replace the chlorine atom by the grouping

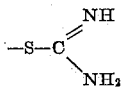

or the salt-form of it, and saponifying this group in an alkaline medium (e.g. NaOH) to obtain the corresponding alkali metal salt of 2-mercapto-4,6-bis-amino-s-triazine, which latter is then alkylated in the group —SNa, for instance by means of an alkyl halogenide.

Though this method avoids the disadvantages of the low reactivity of the chlorine atom in the Compound VI and therefore of Method B, it possesses the inconvenience of more operations and of the difficulty to perform the reaction with thiourea in cases where the compound of Formula VI has—depending on its substituents—a high melting point and/or is difficultly soluble in water and organic solvents. Furthermore, often a purification of the saponification product (—SNA) is necessary before the alkylation step.

It has now been found, and this is the subject of the present invention, that the inconveniences and disadvantages of the above referred known methods can be avoided by a new inventive manufacturing method for the production of compounds of general Formula I with high purity and yield very easily in one step without isolating intermediate products.

The new process according to the present invention consists in firstly reacting cyanuric chloride, preferably in the presence of an acid binding agent with an amine of general formula

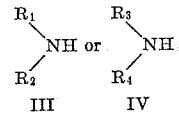

wherein $R_1$ to $R_4$ have the meanings given above, in order to replace one chlorine atom of cyanuric chloride by the corresponding group

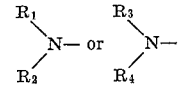

then reacting the intermediary 2,4-dichloro-6-amino-s-triazine derivatives so obtained with an alkyl- or alkenyl-mercaptan of general formula

wherein $R_5$ has the meaning given above, in the presence of an acid binding agent, or with an alkali metal salt of such an alkyl- or alkenyl-mercaptan, in order to obtain an intermediary 2-alkyl- (or 2-alkenyl)-mercapto-4-chloro-6-amino-s-triazine and then reacting the latter, preferably in the presence of an acid binding agent or of an excess of amine with a further amine of formula

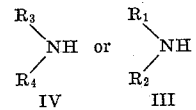

The explanation of the advantages of this new method, using a specific sequence of the three steps, is given in detail as follows: When the cyanuric chloride (II) is reacted in the first step with an amine of Formula III or IV in the presence of an acid binding agent, such as an alkali metal hydroxide or an alkali metal carbonate or an excess of the said amine, at temperatures below 0° C. (exothermic reaction) in proper solvents, such as water, acetone, dioxane, benzene, chloro-benzene or mixtures of such solvents with water, the cyanuric chloride is very selectively converted to a corresponding 2,4-dichloro-6-amino-s-triazine.

The second step reaction of the intermediary 2,4-dichloro-6-amino-s-triazine with an alkyl- or alkenyl-mercaptan of formula $R_5$—SH in the presence of alkali hydroxide or alkali carbonate as an acid binding agent or with a solution of an alkali metal salt of $R_5$—SH (for instance with $R_5$—SNa) was found to proceed at temperatures between 0° and 5° C. whereby only one chlorine atom is replaced by the group —$SR_5$. When conforming to known methods a second amine group would be introduced in the second step, and temperatures of 20° to 40° C. would generally be necessary for the reaction with the second mole of an amine. Surprisingly the reactivity of the remaining third chlorine atom in the intermediary 2-alkyl- (or 2-alkenyl)-mercapto-4-chloro-6-amino-s-triazine obtained after the second step of the new process is pretty high and the final reaction step of introducing a second amine group occurs with good yields at 60 to 70° C. and under ordinary pressure.

Thus it is quite remarkable that the reaction steps mentioned above proceed wtihout any hydrolysis even in water-containing solvents and under alkaline conditions in spite of the presence of starting and intermediary compounds having active chlorine atoms in the molecule. Moreover it was found that the reaction velocity was larger in the presence of water than in the absence of water, especially the mixture of acetone and water gave the best result, almost quantitative from the starting material (II) to the final products (I).

Just as explained above, the method of the present invention has great advantages as the industrial manufacturing method that all the reactions from (II) to (I) proceed selectively with good yields under mild conditions making it unnecessary to isolate each intermediate; therefore the final compounds of Formula I may be obtained directly and continuously from cyanuric chloride with high purity and high yields in a single reaction vessel. The new method of the present invention will be explained more concretely by the following examples; "parts" are given in parts by weight, if parts by volume are not explicitly mentioned.

EXAMPLE 1

To 369 parts of cyanuric chloride 500 parts of acetone and 500 parts of water are added and the mixture is cooled. To this mixture 118 parts of isopropylamine are added dropwise at −10° to 0° C., followed by the dropwise addition of 500 parts by volume of a 4 N sodium hydroxide solution under maintaining of the same temperature. Then 96 parts of methylmercaptan are added in one portion and immediately after that 500 parts by volume of a 4 N sodium hydroxide solution are added, keeping the temperature below 50° C. After stirring the mixture until it turns neutral, 118 parts of isopropylamine are added and then 500 parts by volume of a 4 N sodium hydroxide solution are added and the mixture is refluxed at about 70° C. for two hours. The reaction mixture is cooled, the crystals formed are filtered and dried after washing with water to obtain 472 parts of 2-methylmercapto-4,6-bis(isopropylamino)-1,3,5 - triazine, i.e., a yield of 98% of the theoretical amount based on cyanuric chloride is obtained. The purity is 99.5% (perchloric acid titration).

In the same way as in the above Example 1, the following compounds have been prepared: Compounds for which their melting points are given, are new substances.

| | Yield, per cent | M.P. °C. |
|---|---|---|
| 2-methylmercapto-4,6-bis(ethylamino)-1,3,5-triazine | 95 | |
| 2-methylmercapto-4,6-bis-(diethylamino)-1,3,5-triazine | 90 | |
| 2-ethylmercapto-4,6-bis(ethylamino)-1,3,5-triazine | 92 | |
| 2-n-propylmercapto-4,6-bis(ethylamino)-1,3,5-triazine | 94 | |
| 2-ethylmercapto-4,6-bis(isopropylamino)-1,3,5-triazine | 94 | 101–102 |
| 2-n-propylmercapto-4,6-bis(isopropylamino)-1,3,5-triazine | 95 | 82–83 |
| 2-isopropylmercapto-4,6-bis(isopropylamino)-1,3,5-triazine | 97 | 116–117 |
| 2-n-butylmercapto-4,6-bis(isopropylamino)-1,3,5-triazine | 98 | 78–79 |

EXAMPLE 2

To 369 parts of cyanuric chloride 750 parts of acetone and 750 parts of water are added and then 118 parts of isopropylamine are added dropwise maintaining the temperature at −10° C. to 0° C. Then 500 parts by volume of a 4 N sodium hydroxide solution are added, maintaining the same temperature as the above. After stirring the mixture until it turns neutral, 700 parts of a 20% sodium methylmercaptide solution are added dropwise and gradually. The mixture is stirred until it turns neutral, then 260 parts of a 70% monoethylamine solution are added, and the whole mixture is refluxed for two hours, cooled, and the crystals formed are filtered off and dried after washing with water. In this way 443 parts of 2-methylmercapto-4-ethylamino - 6 - isopropylamino - 1,3,5 - triazine are obtained which corresponds to 97% of the theoretical amount based on cyanuric chloride.

In the same way as described in this example the following compounds have been prepared. Compounds for which their melting points are indicated, are new substances.

| | Yield, percent | M.P. °C. |
|---|---|---|
| 2-methylmercapto-4-methylamino-6-isopropylamino-1,5-triazine | 95 | |
| 2-methylmercapto-4-diethylamino-6-isopropylamino-1,3,5-triazine | 98 | 88–89 |
| 2-methylmercapto-4-isopropylamino-6-γ-methoxypropylamino-1,3,5-triazine | 94 | |
| 2-methallylmercapto-4-diallylamino-6-γ-methoxypropylamino-1,3,5-triazine | 93 | |

EXAMPLE 3

To 184 parts of cyanuric chloride 250 parts of acetone and 250 parts of water are added and the mixture is cooled. To this mixture 60 parts of isopropylamine are added dropwise at −10° to 0° C., followed by the dropwise addition of 230.5 parts by volume of a 4 N sodium hydroxide solution under the same temperature. Then 50 parts of methylmercaptan are added in one portion, and immediately after that 230.5 parts by volume of a 4 N sodium hydroxide solution are added and the temperature is kept at 5° C. The stirring is continued until the reaction solution turns neutral. Thereafter the reaction mixture is heated to 70° C. and ammonia gas is bubbled in for 4–5 hours. After cooling the reaction mixture, the product is extracted with benzene and the benzene solution is washed with water. After distilling off the benzene 190 parts (95.5% of the theoretical amount) of 2-methylmercapto-4-amino-6 - isopropylamino -1,3,5 - triazine are obtained. This compound consists of white and hard crystals of M.P. 114–116° C., recrystallizable from benzene.

EXAMPLE 4

To 184 parts of cyanuric chloride 250 parts of acetone and 250 parts of water are added and the mixture is cooled. The mixture is kept at −10° to 0° C., then 65 parts of a 70% aqueous ethylamine solution are added and thereupon 253.5 parts by volume of a 4 N sodium hydroxide solution are added continuously. Then 50 parts of methylmercaptan are added in one portion, and immediately after that 253.5 parts by volume of a 4 N sodium hydroxide solution are added dropwise, followed by stirring of the reaction solution at 5° C. until it turns neutral. Then 10 parts of wet copper powder and 1100 parts by volume of a 28% ammonia solution are added and heated to 70° C. After 1 hour 500 parts by volume of a 28% ammonia solution are added and after every 1 hour 500 volume parts of a 28% ammonia solution are added totaling 4 times and finally the reaction mixture is refluxed for 1 hour. The reaction mixture is cooled, and the product is extracted with benzene. The benzene solution is washed with water until it becomes neutral. After distilling off the benzene, 166 parts (90% of the theoretical amount) of 2-methylmercapto-4-amino - 6 - ethylamino-1,3,5-triazine are obtained. This compound consists of white crystals of M.P. 119–120° C., recrystallizable from benzene.

EXAMPLE 5

To 184 parts of cyanuric chloride 1000 parts of acetone and 250 parts of water are added. To this mixture 61 parts of a 28% ammonia solution are added dropwise below −5° C. and successively 225 parts by volume of a 4 N sodium hydroxide solution are added at the same temperature. Then 50 parts of methylmercaptan are added and 225 parts by volume of a 4 N sodium hydroxide solution are added dropwise by continuing stirring until the reaction solution turns neutral. For the last 20 minutes of this procedure the temperature should be 35–40° C.

Then 128 parts of a 70% aqueous ethylamine solution are added and refluxed for 3 hours. After cooling the reaction mixture, the product crystallizes and is filtered off. After washing the crystals with water and drying, 165 parts (89% of the theoretical amount) of 2-methylmercapto-4-amino-6-ethylamino-1,3,5-triazine are obtained, and identified as being the same product as obtained in Example 4.

EXAMPLE 6

When 128 parts of a 70% aqueous ethylamine solution were replaced by 120 parts of isopropylamine in Example 5 and treated in the same way, 175 parts (88% of the theoretical amount) of 2-methylmercapto-4-amino-6-isopropylamino-1,3,5-triazine are obtained.

What is claimed is:
1. Process for the production of 2-mercapto-4,6-bis-amino-s-triazine of the formula

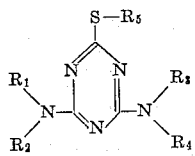

wherein
  $R_1$, $R_3$ and $R_4$, independently from each other, represent hydrogen atoms or lower aliphatic hydrocarbon radicals the chains of which may be interrupted by oxygen or sulphur,
  $R_2$ represents a lower aliphatic hydrocarbon radical the chain of which may be interrupted by oxygen or sulphur, and
  $R_5$ represents a low molecular alkyl or alkenyl radical, starting from cyanuric chloride, by replacing two chlorine atoms of the latter by amino groups and one chlorine atom by an alkylmercapto- or alkenylmercapto group in a solvent or diluent as the reaction medium, which process comprises firstly reacting cyanuric chloride, in the presence of an acid binding agent, with one of the amines

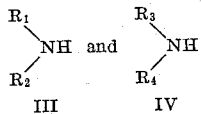

wherein $R_1$ to $R_4$ have the meanings given above, in order to replace one chlorine atom of cyanuric chloride by the corresponding one of the groups

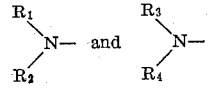

and then reacting in a second step the intermediary 2,4-dichloro-6-amino-s-triazine so obtained with a member selected from the group consisting of mercaptans of the formula $$R_5-SH$$

and alkali metal salts thereof, wherein $R_5$ has the meaning given above, the reaction being carried out in the presence of an acid binding agent when compound $R_5-SH$ is employed, to obtain the corresponding 2-substituted-mercapto-4-chloro-6-amino-s-triazine, and then reacting the latter in the third step with one of the amines

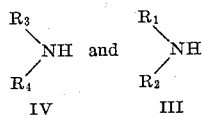

in the presence of an acid binding agent.

2. Process according to claim 1, which comprises performing all three reaction steps continuously in the same reaction vessel, without isolating the intermediary products.

3. Process according to claim 1 wherein the amine of Formula IV used contains at least one substituent different from hydrogen.

4. Process according to claim 1 wherein the amine of Formula IV used is ammonia ($NH_3$).

5. Process according to claim 1 wherein the first step is performed at temperatures below 0° C., the second step at temperatures between 0° and 5° C. and the third step at temperatures between 60° and 70° C.

6. Process according to claim 1 wherein the acid binding agent used for at least one of the steps 1 and 3 is an alkali-metal hydroxide or alkali-metal carbonate.

7. Process according to claim 1 wherein as acid binding agent for at least one of the steps 1 and 3 an excess of the amine is used.

References Cited

UNITED STATES PATENTS 3,156,690  11/1964  Dexter et al. ____ 260—249.8 X
3,202,681  8/1965   Dexter et al. ____ 260—249.8 X
3,207,756  9/1965   Knusli et al. _____ 260—249.8

OTHER REFERENCES

Koopman, "Niewe Herbicide 1,3,5-Triazine Derivaten," University of Groningen (1957), pp. 9–22.

WALTER A. MODANCE, *Primary Examiner.*

JOHN M. FORD, *Examiner.*

NORMA S. MILESTONE, *Assistant Examiner.*